2 Sheets—Sheet 1.

J. H. BAKER.

DIE AND DIE BLOCK FOR FORGE HAMMERS.

No. 10,680. Reissued Jan. 26, 1886.

WITNESSES:
H. Beyer
C. Sedgwick

INVENTOR:
J. H. Baker
BY Munn & Co
ATTORNEYS.

N. PETERS, Photo-Lithographer, Washington, D. C.

2 Sheets—Sheet 2.

J. H. BAKER.

DIE AND DIE BLOCK FOR FORGE HAMMERS.

No. 10,680. Reissued Jan. 26, 1886.

WITNESSES:

H. Hobleyer

C. Sedgwick

INVENTOR:

J. H. Baker

BY Munn & Co

ATTORNEYS.

N. PETERS, Photo-Lithographer, Washington, D. C.

UNITED STATES PATENT OFFICE.

JAMES H. BAKER, OF WESTVILLE, OHIO.

DIE AND DIE-BLOCK FOR FORGE-HAMMERS.

SPECIFICATION forming part of Reissued Letters Patent No. 10,680, dated January 26, 1886.

Original No. 280,998, dated July 10, 1883. Application for reissue filed October 1, 1883. Serial No. 107,892.

*To all whom it may concern:*

Be it known that I, JAMES H. BAKER, of Westville, in the county of Champaign and State of Ohio, have invented new and useful Improvements in Dies and Die-Blocks for Forge-Hammers, of which the following is a full, clear, and exact description.

My invention consists in a locking device for holding the stock in the die while being forged, and a shifting contrivance of the die-block for moving the stock under the hammer while being forged, for widening or plating out the stock, all as hereinafter fully described.

Reference is to be had to the accompanying drawings, forming part of this specification, in which similar letters of reference indicate corresponding parts in all the figures.

Figure 1:
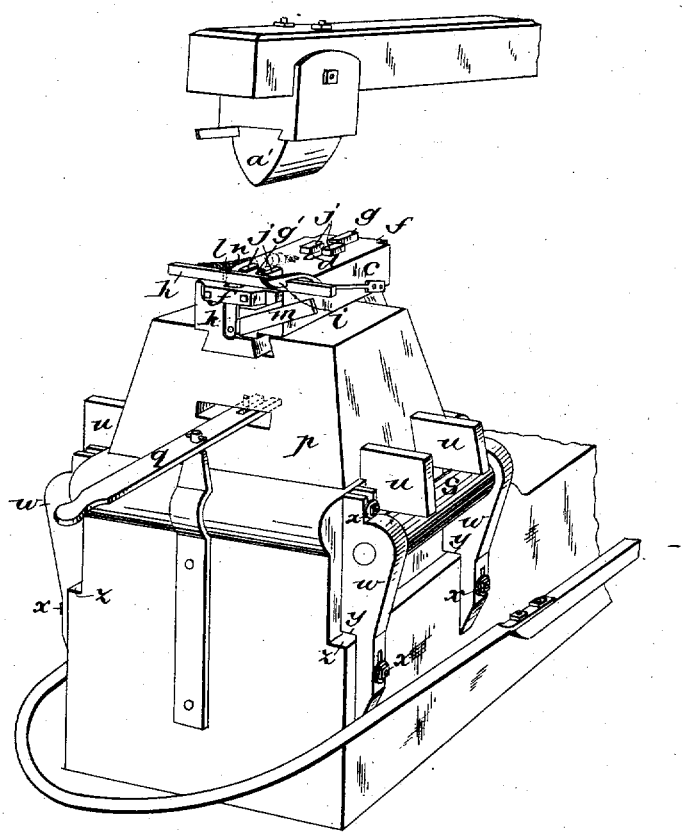
Figure 2:
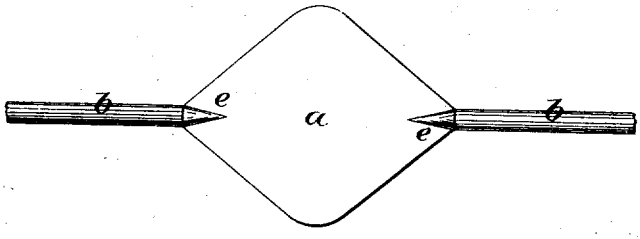
Figure 3:
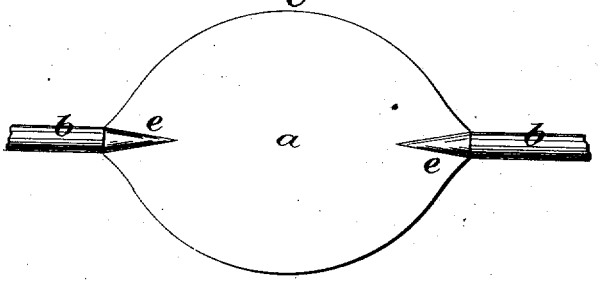
Figure 4:
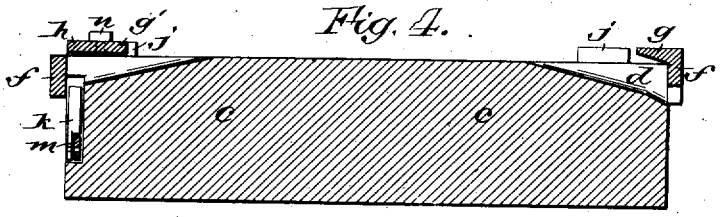

Figure 1 is a perspective view of a die and die-block, anvil, anvil-support, and part of a forge-hammer constructed according to my invention. Figs. 2 and 3 are plan views of single-tree clips, which are represented as examples of the kind of work for which the improvements are more especially designed; and Fig. 4 is a longitudinal section of a die, with the locking devices which I propose to apply for holding the stock while being forged.

For any kind of work similar to the single-tree clips represented in Figs. 2 and 3, in which wide plates *a* are to be forged out of rods *b*, I propose to make special dies *c* for each form, with a groove, *d*, at each end, into which those parts of the rod or bar that are not to be forged, and where tapers *e* are to be formed, are to be placed, with stop-bars *f* to prevent elongation of the rods, the stop-bar at one end having a projecting lip, *g*, and the other end of the die having a lever, *h*, with a similar lip, *g'*, to swing over the end of the rod thereat and be fastened by a spring-catch, *i*, and on each side of these grooves I arrange retaining-cleats *j*, making the lock which I propose to employ for securing the stock in the die to be forged.

Under the lever *h* is a discharger, *k*, to be employed for thrusting up the end of the forged article when completed. This discharger is operated, after lever *h* has been released from catch *i* and withdrawn by spring *l*, by means of lever *m*, by a blow of a hammer, which in turn is used for disconnecting lever *h* by striking up the spring-catch *i*.

In case it may be desired to allow the rod to extend lengthwise, I propose to employ a lever, *h*, at each end to hold the rod at its ends by the lips *g*, the said levers being fixed on pivots *n*, allowing them to rise, and the spring-catches *i* and springs *l* tending to press them down and hold the stock in place. In this case the stock will be shorter than the distance between the stop-bars, or they may be removed. I propose to employ a lock of this kind to hold stock for any kind of forgings to which it is adapted, whether the die-blocks be mounted adjustably or not; but for any forgings requiring the die to be shifted under the hammer—such, for instance, as the single-tree clips represented—I propose to employ it, together with a die-block, *p*, contrived to be shifted laterally under the hammer by means of a lever, *q*, the said die-block being mounted to slide in the dovetail ways of the anvil, with or without friction-rollers *s* to lessen the resistance.

When I wish to arrange the die-block of a hammer already constructed to shift in this manner, I plane slots through it above the places where the keys are located to bind it in the dovetail groove of the anvil, and fit projecting bars *u* in the anvil, to bear on rollers *s*. These rollers are applied by means of brackets *w*, bolted against the sides of the anvil by bolts *x*, fitted in slotted holes, to allow the brackets to be shifted up and down for adjusting the rollers, the brackets having notches at *y*, to be packed with liners on ledges *z*, as required; but when the improvement is to be applied to new hammers grooves may be planed or otherwise made in the anvil for the rollers, and the die-block may have flanges suitably projecting over the rollers to work on them. By means of these devices the stock may be securely held and properly adjusted under the forge-hammer *a'* while being forged, to be used for plating out the stock, the said hammer being what is known in the art as the "fuller," which is of the form represented in the drawings; but my improved locking and shifting devices may be used with other forms of hammers.

Having thus described my invention, what I claim as new, and desire to secure by Letters Patent, is—

1. The combination of the locking device, consisting of stop-bars *f*, lever *h*, and lips *g*, with the die *c*, having grooves *d*, substantially as described.

2. The combination of discharger *k* with die *c*, having grooves *d*, stop-bars *f*, and lever *h*, substantially as described.

3. The combination of lever *h*, spring-catch *i*, and spring *l*, with the die *c*, having grooves *d* and stop-bars *f*, substantially as described.

4. The combination, with a die, *c*, having grooves *d*, of retaining-cleats *j* and lips *g*, substantially as described.

5. The combination, with the die *c*, having the end grooves, *d d*, of the dischargers *k k* and the lever *m*, whereby the end of the forged article may be thrown up, as described.

6. The combination, with the die *c*, having end grooves, *d d*, of the stopper *f*, having lip *g*, the swinging lever *h*, provided with a corresponding lip, *g*, and the retaining-clips *j*, all arranged substantially as shown and described.

7. The combination, with the lever *h*, of the spring *l* and spring-catches *i*, to hold the lever on the article to be forged, as described.

8. The combination, with an anvil-block, of a movable block, a die, and a shifting-lever, as and for the purpose specified.

9. The combination, with the die-block *p*, having ledges *z*, of the bars *u*, rollers *s*, and the notched shifting-brackets *w*, as and for the purpose set forth.

10. The combination of a laterally-adjustable die-block, *p*, projecting supporting-bars *w*, and friction-rollers *s*, substantially as described.

11. The combination of a laterally-shifting die-block, *p*, projecting supporting-bars *w*, friction-rollers *s*, and adjustable bearing-brackets for said rollers, substantially as described.

JAS. H. BAKER.

Witnesses:

GEORGE A. JEWELL,
JOHN RICHARDSON.